United States Patent [19]

Butler et al.

[11] Patent Number: 4,641,037

[45] Date of Patent: Feb. 3, 1987

[54] ORGANIC METAL NEUTRON DETECTOR

[75] Inventors: Michael A. Butler; David S. Ginley, both of Albuquerque, N. Mex.

[73] Assignee: The United States of America as represented by the United States Department of Energy, Washington, D.C.

[21] Appl. No.: 673,969

[22] Filed: Nov. 21, 1984

[51] Int. Cl.$^4$ .................................................. G01T 3/00
[52] U.S. Cl. .................................... 250/390; 250/370; 250/472.1
[58] Field of Search .......... 250/370 C, 370 G, 390 A, 250/472.1, 390 B, 370 P

[56] References Cited

U.S. PATENT DOCUMENTS

| | | | |
|---|---|---|---|
| 3,113,210 | 12/1963 | Hill | 250/390 R |
| 3,227,876 | 1/1966 | Ross | 250/370 C |
| 3,999,071 | 12/1976 | Siffert et al. | 250/370 J X |
| 4,381,454 | 4/1983 | Griffith et al. | 250/472.1 |
| 4,383,179 | 5/1983 | Eisen et al. | 250/472.1 |
| 4,419,578 | 12/1983 | Kress | 250/370 C |
| 4,445,036 | 4/1984 | Selph | 250/370 E |

OTHER PUBLICATIONS

Wynne, "Conducting Polymers. A Short Review", Ind. Eng. Chem. Prod. Res. Dev., 21, 1982, pp. 23–28.
Bloor, "Plastics That Conduct Electricity", New Scientist, Mar. 4, 1982, pp. 577–580.

Primary Examiner—Carolyn E. Fields
Attorney, Agent, or Firm—Armand McMillan; Albert Sopp; Judson R. Hightower

[57] ABSTRACT

A device for detecting neutrons comprises a layer of conductive polymer sandwiched between electrodes, which may be covered on each face with a neutron transmissive insulating material layer. Conventional electrodes are used for a non-imaging integrating total neutron fluence-measuring embodiment, while wire grids are used in an imaging version of the device. The change in conductivity of the polymer after exposure to a neutron flux is determined in either case to provide the desired data. Alternatively, the exposed conductive polymer layer may be treated with a chemical reagent which selectively binds to the sites altered by neutrons to produce an image of the flux detected.

17 Claims, 3 Drawing Figures

4,641,037

ORGANIC METAL NEUTRON DETECTOR

The U.S. Government has rights in this invention pursuant to Contract No. DE-AC04-76DP00789 between the U.S. Department of Energy and AT&T Technologies, Inc.

BACKGROUND OF THE INVENTION

The detection of neutrons is normally a problem because of their lack of charge and therefore weak interaction with matter. Neutron detectors currently available use the interaction of neutrons with a converter material with a high neutron cross-section, such as B for thermal neutrons and hydrogenous materials for fast neutrons. The neutrons interact with these materials and generate charged particles. The charged particles are then detected in a conventional manner. Various other systems for neutron detection have also been proposed. See, e.g., U.S. Pat. Nos. 3,113,210, 3,227,876, 3,999,071, and 4,383,179.

The most desirable form of neutron detector would combine a material with a large neutron cross-section and appropriate electronic properties so that neutron fluxes could be read directly.

SUMMARY OF THE INVENTION

Accordingly, it is an object of this invention to provide a neutron detector which is based on an active element which responds directly to the presence of neutrons.

It is another object of this invention to provide a method for detecting the presence of neutrons directly.

Upon further study of the specification and appended claims, further objects and advantages of this invention will become apparent to those skilled in the art.

These objects of this invention have been achieved by providing a device for detection of neutrons comprising:

as an active neutron sensing element, a conductive organic polymer having an electrical conductivity and a cross-section for said neutrons whereby a detectable change in said conductivity is caused by impingement of said neutrons on the conductive organic polymer;

means operatively associatable with said conductive organic polymer which is responsive to a property of said polymer which is altered by impingement of said neutrons on the polymer; and means for associating a change in said alterable property with the presence of neutrons at the location of said device.

In another aspect, these objects have been achieved by providing a method of detecting the presence of neutrons at a location, comprising:

including at that location as an active neutron sensing element, a conductive organic polymer having an electrical conductivity and a cross-section for said neutrons whereby a detectable change in said conductivity is caused by impingement of said neutrons on the conductive organic polymer.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION

Figure 1:
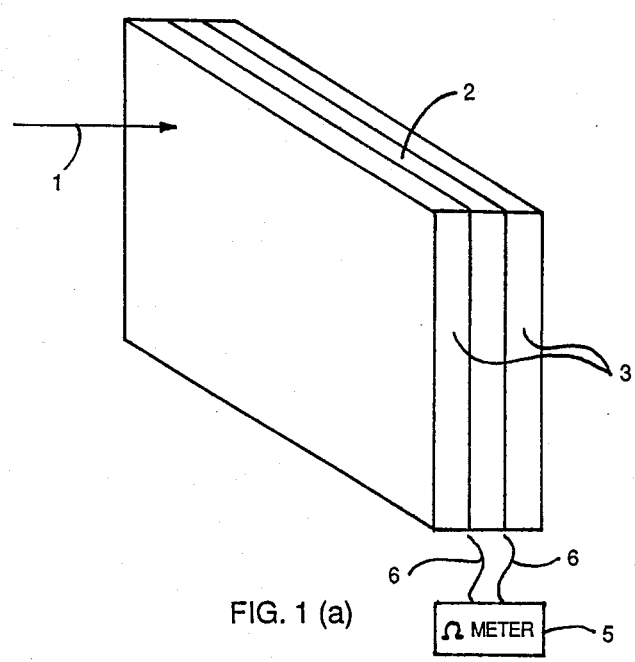
FIG. 1 shows two embodiments of devices of this invention.
Figure 1B:
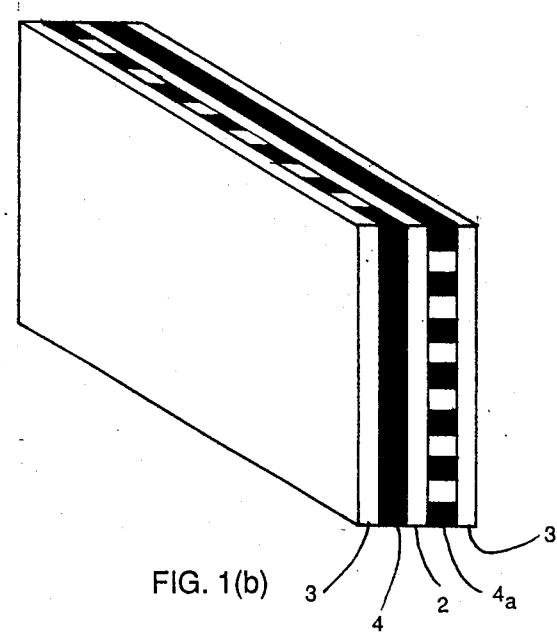

In FIG. 1(a), an integrating or non-imaging emdodiment of the invention is shown partly in perspective and partly in schematic fashion, while in FIG. 1(b), an imaging embodiment is shown in perspective. With either embodiments, a neutron flux 1 can be detected and measured by passing through neutron transmissive insulating layers 3 which may cover the front and back faces of a conductive organic polymer (organic metal) layer 2. Depending of the nature of the organic metal used, its exposed edges between insulating layers 3 may be sealed from the atmosphere with a non-porous sealant (not shown).

In the integrating embodiment of FIG. 1(a), after exposure to a neutron flux, conventional metal electrodes (not shown) sandwiching conductive polymer sheet 2 allow current measurement through leads 6 by means of a conductivity measuring apparatus 5, shown in schematic form. The actual ohmic connecting points of leads 6 to the electrodes through the sealant, if any, cannot be seen in the perspective rendition of the device. As is evident from the construction of this embodiment, the total fluence of neutrons in a given flux is what it determines.

In the FIG. 1(b) imaging embodiment, on the other hand, there is used, in lieu of conventional metal electrodes, wire grid layers 4 and 4a located on each face of the conductive polymer sheet 2, with the wires in one grid being perpendicular to the wires in the other grid. Ohmic contacts (not shown) connect each wire of the grids to conventional conductivity measurement equipment to provide a cross-sectional image of the neutron flux in the conductivity space.

Conductive organic polymers, e.g., polyacetylene, contain atoms which have a significantly high cross-section for fast and/or slow neutrons. Most notably, these include hydrogen or boron as a dopant. For polyacetylene stoichiometrically half of its atoms $(CH)_x$ are hydrogen. This polymer and other conductive organic polymers can be prepared as insulators, semiconductors or metals depending upon the charge in the polymer, the degree of unsaturation in the carbon-carbon chain, the nature of oxidative or reductive processing thereof, the content and identity of dopants, the purity of the material, etc.

Without intending to limit the scope of this invention in any way, it is theorized that the interaction between a neutron and the conductive organic polymer results in the displacement of protons due to the relatively large cross-section of H atoms for fast neutrons. The resultant damage to the material changes the conductivity of the polymer. As well, other properties of the polymer will be affected by the neutron interaction. The resultant measurable change in the properties of the polymer, most notably the electrical conductivity, can be directly measured, preferably electronically, thereby providing a qualitative and/or quantitative assessment of the neutron flux. Of course, if desired, the initial generation of charged particles due to the neutron interaction will be directly readable electronically by conventional current measurements through the organic metal film sandwiched between conventional metal electrodes.

In principle, any conductive organic polymer can be used in conjunction with this invention, as long as it contains atoms having a sufficiently high cross-section for the neutron flux of interest that the property changes attendant to the interaction between the neutrons and the polymer are measurable. For most applications, the atoms of interest, as mentioned above, will be hydrogen and boron. Accordingly, if a conductive organic polymer contains sufficient hydrogen atoms, it will be employable for purposes of this invention as long as the other considerations discussed herein are met.

In general, the organic polymer should have a conductivity in the range of $10^{-6}$ to $10^{-12}$ $(\Omega \text{ cm})^{-1}$ which will provide a sensitivity to neutron fluxes in the approximate range of about $10^{18}$ to $10^{12}$ n/cm$^2$. Conductivities above and below the mentioned range will, of course, be applicable under appropriate circumstances. In general, the conductivity of the polymer should be selected to be as small as possible to still provide a measurable response in conjuction with the neutron flux of interest. In this way, maximum sensitivity will be provided. As long as a candidate polymer has the requisite neutron cross-section and the requisite conductivity as described above, it will provide a suitable active element for use in conjunction with the neutron detector of this invention.

Any neutron flux 1, irrespective of its energy, will be detectable in accordance with this invention as long as the conductive organic polymer has the necessarily high cross-section therefor. In general, there is no limitation on the range of appropriately energetic neutrons. Both those normally characterized as fast (e.g., over 10 eV) and as slow (e.g., under 10 eV) are detectable. In fact, even other types of radiation can be detected in conjuction with this invention since the conductive organic polymers generally have suitably high cross-sections therefor. For instance, gamma rays are detectable although the organic polymers are approximately two orders of magnitude less sensitive to them than to neutrons.

The preparation of the conductive organic polymers is per se conventional and is well documented in the literature. See, e.g., "Conductive Polymers," ed. by Raymond B. Seymour (Plenum Press, 1981), New York; "Plastics that Conduct Electricity," Dr. Bloor, New Scientist, Mar. 4, 1982, 577; "Conducting Polymers A Short Review," K. T. Wynne, G. B. Street, Indust. Eng. Prod. Research Dev., 21, 23 (1982); etc., whose disclosures are incorporated by reference herein. These conventional techniques include chemical oxidation and/or reduction; electrochemical oxidation and/or reduction in conjunction with electrolytes providing the desired dopants, most notably boron-containing ions; thermal doping; and other growth and/or doping techniques. Similarly, film growing of the conductive organic polymers is also per se conventional and described in depth in the literature. Typically, suitable film thicknesses 2 will be in the range of 100 $\mu$m-1 mm or so, the actual thickness not being critical. It is also possible to utilize several overlapping thicknesses of film. The organic polymers can also be used in the form of particles, e.g., compressed particles, etc.

Typical suitable organic polymers include polyacetylene and also other more air stable systems, e.g., polythiophene and its derivatives, e.g., polythiophene substituted by phenyl, alkyl (e.g., methyl) etc., polypyrrole, polyaniline, the polyphenylene sulfides, the polyquinones, etc.; See, e.g., the references cited above.

The shape of the conductive organic polymer is entirely non-critical, films, rods, spheres, irregular shapes, etc., all being appropriate. Similarly, both n- and p-type polymers can be utilized. The polymers will produce satisfactory neutron detection irrespective of the angle of attack of the neutron flux.

The electronic circuitry 5 necessary to measure the property which changes upon interaction with the neutron flux is entirely conventional. That property, namely conductivity (FIG. 2), is measured by commercially available equipment of the type normally associated with the measurement of low current and, consequently, low conductivity.

Another advantage of the system of this invention is the ease of calibration. As long as the thickness of the organic polymer in the path of the neutrons is known, a quantitative calibration can be performed. The thickness is directly correlatable with the known density of hydrogen or other neutron sensitive species in the polymer, thereby providing means to calculate the number of collisions which will be encountered by the penetrating neutrons. In conjunction with the quantum efficiency of the interaction (essentially 1), a quantitative calibration can be directly made.

Some conductive organic polymers are sensitive to oxygen in the atmosphere. As a result, it is preferred that they be hermetically sealed in operation. Typically, the front and back faces of the organic poylmer, including the metal contacts will be covered by neutron transmissive insulating layers 3, e.g., quartz or other highly unsaturated polymers having few hydrogen atoms or atoms otherwise insensitive to neutrons. The edges of the conductive polymer can be conventionally sealed with non-porous sealants, preferably epoxies.

The actual size of the active element is non-critical and is essentially unlimited. The films can be grown to very large areas, e.g., about 1,000 cm$^2$ or much larger. Films can also be attached to one another to provide extremely large cross-sectional areas where a given application admits of such a detector.

In an advantageous embodiment of this invention, the sensitive organic polymer can be fitted with a plurality of contacts 4 at different surface sites of the film. The local conductivity at each site can then be measured to provide a cross-sectional image of the neutron flux in conductivity space. Such devices can be fabricated readily using highly conventional technology used in the optical display industry, e.g., using wire contact grid layers 4 such as those employed in conjunction with liquid crystal optical displays. The resolution achievable in such an image is limited only by the state-of-the-art of making the contacts. The organic polymers provide a resolution on an atomic scale since one neutron interacts with essentially only one atom in the polymer.

In another option, the polymer which has been exposed to neutrons can be "developed" by chemical reaction with a reagent selectively binding to the sites of the polymer which have undergone an interaction with a neutron. In this way, the chemical reactant will bind only to affected sites and not to unaffected sites. Again, this provides a chemical image of a cross-section of the neutron flux. A wide variety of chemicals can be employed for this purpose. Presently, it is contemplated that amines (ammonia, triethylamine, etc.) and amides, e.g., of hydrocarbon aliphatic carboxylic acids (among others) will be especially useful. In order to provide an observable image, these chemicals can be tagged in various conventional ways, e.g., with conventional radioactive species, with luminescent species, with co-ordinated metal cations which can be observed by X-rays, etc.

It has also been discovered that the neutron "damage" to the organic polymers is by and large reversible. That is, the conductivity change over time will revert to its initial state unless the neutron damage is fixed in the polymer. One method of fixing the effects of the neutrons is to develop the film with one of the chemical reagents discussed above. Consequently, for example, if it is desired to provide a total dose meter in accordance with this invention, then the film should be operatively associated with a chemical entity which can fix the effects of the neutron flux. For example, this can be accomplished by sealing the organic polymer in an environment containing gaseous species, e.g., provided by outgassing from the sealing epoxy which react with the damaged sites of the polymer. In this way, the measurable property, e.g., conductivity, will represent the total effects of the total neutron flux to which the device has been exposed.

On the other hand, where it is desired to obtain a measure of the temporal properties of a neutron flux, conventional means should be taken to ensure that the organic film is not exposed to any reagents which might fix the effects of the neutrons therein. In this way, the device can be made in a mode in which it is reusable for purposes of merely indicating and quantifying the existence of neutrons without permanently imaging the same.

It is also contemplated as an equivalent of this invention to incorporate the organic metal active elements of this invention into charge coupled imaging devices to provide another manner of directly electronically imaging the neutron flux.

As previously mentioned, where it is desired to detect neutron fluxes having a relatively low cross-section in collisions with hydrogen atoms, the polymers can be conventionally doped to include ions which have the necessary higher cross-section for the neutron flux of interest. Most notably, ions such as $BF_4^-$ can be incorporated in order to provide a good response to slow neutrons.

This invention is applicable to both continuous and pulsed neutron fluxes.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Trans-polyacetylene $(CH)_x$ samples having conductivities of about $10^{-10}$ $(\Omega\ cm^{-1})$ were exposed in the SPR-III and ACRR reactors to high neutron fluxes. The polyacetylene samples were approximately one square inch in area and 100 $\mu$m thick. They were fitted with four-probe electric contacts made with Electrodag contact paste. These were connected to silver/copper wires. The active polyacetylene element was potted between two quartz windows using either Hysol epoxy or Torrseal epoxy. The devices were fabricated in an argon atmosphere dry box. The polyacetylene was of extremely high purity and had a very low intrinsic conductivity as mentioned. The total flux upon exposure was $3 \times 10^{16}$ neutron/cm$^2$. There resulted an increase in conductivity of a factor of 1,000. This was consistent with the expected quantum yield of 1.0.

EXAMPLE 2

Figure 2:
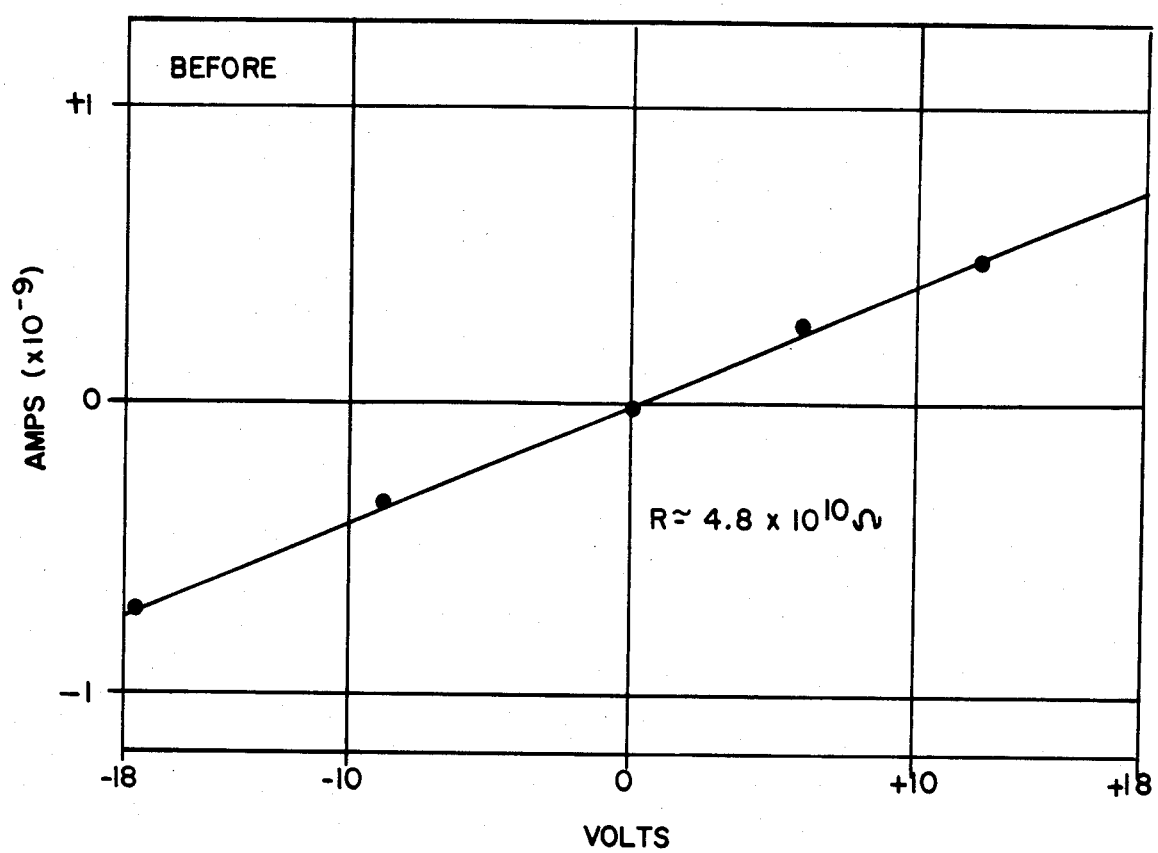
FIG. 2 shows the conductivity of an organic polymer before and after irradiation by neutrons.
Figure 2:
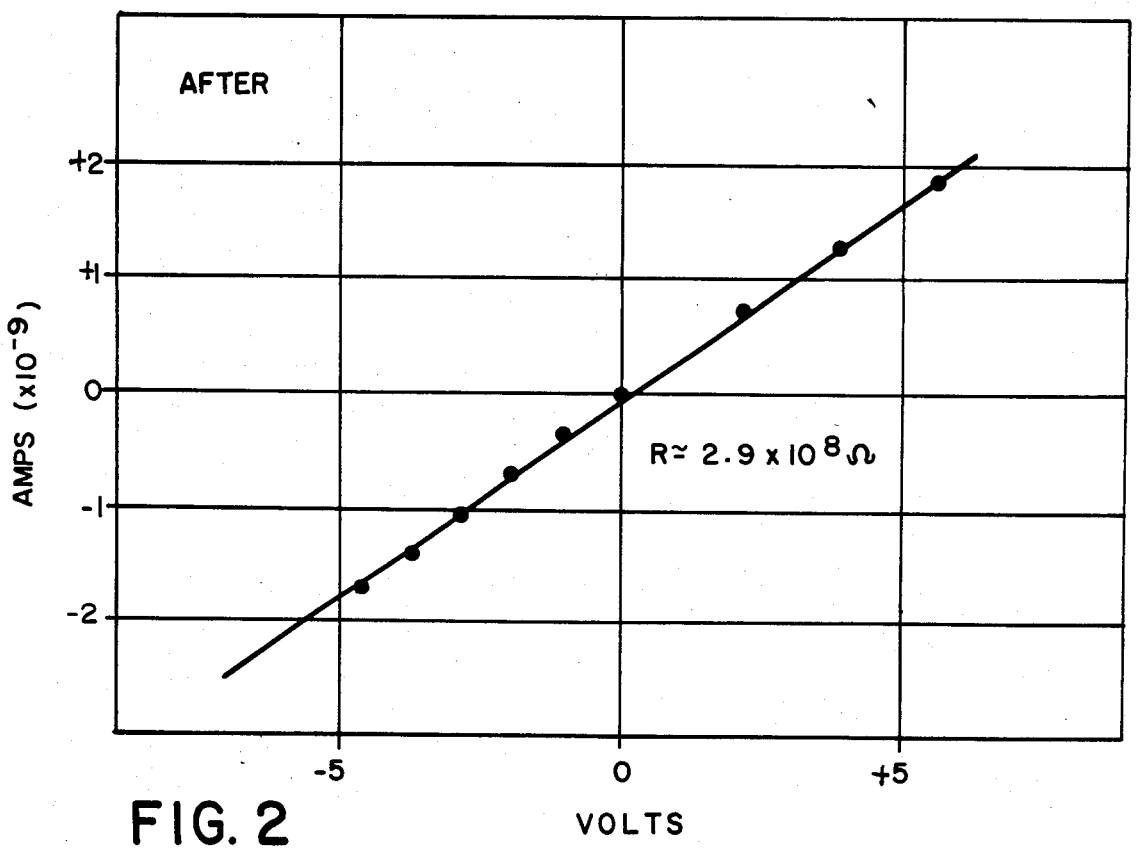

The experiment of example 1 was repeated using the total neutron flux of $3.5 \times 10^{16}$ n/cm$^2$. The results before and after irradiation are shown in FIG. 2.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A device for detection of neutrons, comprising:
   as an active neutron sensing element, a conductive organic polymer having both electrical conductivity and a cross-section for said neutrons such that a detectable semipermanent change in said conductivity is caused through impingement of said neutrons on the organic polymer;
   means operatively associatable with said conductive organic polymer, which is responsive to a property of said polymer altered by impingement of said neutrons on said polymer; and
   means for associating a permanent or semi-permanent change in said conductivity with the presence of neutrons at the location of said device.

2. A device of claim 1, wherein the conductivity of the conductive organic polymer in the unirradiated state is about $10^{-12}$ to about $10^{-6}$ $(\Omega\ cm)^{-1}$.

3. A device of claim 1, wherein said means responsive to a property of the conductive organic polymer is a means responsive to the conductivity of the polymer.

4. A device of claim 3, wherein the conductive organic polymer is in the form of a film and the device further comprises insulating layers in contact with the front and back faces of the film which seal the latter from the surrounding atmosphere.

5. A device of claim 4, wherein said conductivity responsive means comprises multiple ohmic electrical contacts, each one being located at a different situs on the surface of the conductive polymer, and further comprising associated electrical circuitry means for measuring the local conductivity of the polymer at each situs.

6. A device of claim 5, wherein the thickness of the film of the conductive organic polymer is about 100 $\mu$m to about 1 mm.

7. A device of claim 4, wherein the conductive organic polymer is polyacetylene.

8. A device of claim 5, wherein the conductive organic polymer is polyacetylene.

9. A device of claim 1, wherein the conductive organic polymer is in the form of a film and wherein said property responsive means and said neutron presence associating means are a chemical reagent which when reacted with said film after it has been exposed to neutrons, will selectively bind to sites of the polymer film which have undergone an alteration due to an interaction with the neutrons.

10. A method of detecting the presence of neutrons at a location, comprising:
including at that location as an active neutron sensing element, a conductive organic polymer having both electrical conductivity and a cross-section for said neutrons such that a detectable semi-permanent change in said conductivity is caused through impingement of said neutrons on the conductive organic polymer; and
after impingement of said neutrons on said polymer, observing the value of a property of said polymer which has undergone neutron related permanent or semi-permanent alteration.

11. A method of claim 10, wherein the conductivity of the conductive organic polymer in the unirradiated state is about $10^{-12}$ to about $10^{-6}$ $(\Omega\ cm)^{-1}$.

12. A method of claim 10, wherein said property is the electrical conductivity of the polymer.

13. A method of claim 10, wherein the conductive organic polymer is in the form of a film.

14. A method of claim 10, wherein the organic polymer is polyacetylene and the neutrons are fast neutrons.

15. A method of claim 13, wherein the organic polymer is polyacetylene and the neutrons are fast neutrons.

16. A method of claim 13, wherein the polymer film is covered by a front and back insulating layer and said property is electrical conductivity which is measured at a plurality of sites on the surface of the polymer so as to obtain a cross-sectional conductivity image of the neutron flux impinging on the device.

17. A method of claim 13, further comprising reacting the film which has been exposed to the neutron flux with a chemical reagent which selectively binds to sites of the polymer film which have undergone an alteration due to an interaction with the neutrons so as to obtain a chemical image of the neutron flux impinging on the device.

* * * * *